(12) United States Patent
Taniguchi et al.

(10) Patent No.: US 9,289,013 B2
(45) Date of Patent: Mar. 22, 2016

(54) CIGARETTE FILTER

(75) Inventors: Hiroki Taniguchi, Himeji (JP); Hiroki Karakane, Himeji (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 14/407,487

(22) PCT Filed: Jul. 26, 2012

(86) PCT No.: PCT/JP2012/068985
§ 371 (c)(1),
(2), (4) Date: Dec. 12, 2014

(87) PCT Pub. No.: WO2013/186938
PCT Pub. Date: Dec. 19, 2013

(65) Prior Publication Data
US 2015/0164134 A1 Jun. 18, 2015

(30) Foreign Application Priority Data

Jun. 14, 2012 (JP) .................. 2012-134340

(51) Int. Cl.
| | |
|---|---|
| *A24D 3/08* | (2006.01) |
| *A24D 3/10* | (2006.01) |
| *A24D 3/06* | (2006.01) |
| *C08L 1/12* | (2006.01) |
| *A24D 3/16* | (2006.01) |
| *A24D 3/14* | (2006.01) |

(52) U.S. Cl.
CPC *A24D 3/08* (2013.01); *A24D 3/063* (2013.01); *A24D 3/068* (2013.01); *A24D 3/10* (2013.01); *A24D 3/14* (2013.01); *A24D 3/16* (2013.01); *C08L 1/12* (2013.01)

(58) Field of Classification Search
USPC ......... 106/106, 162.7–162.72, 162.9–164.01; 131/331, 332, 345; 493/39, 50; 524/41
See application file for complete search history.

(56) References Cited

U.S. PATENT DOCUMENTS

| | | | |
|---|---|---|---|
| 5,678,577 A | 10/1997 | Matsumura et al. | |
| 5,690,126 A * | 11/1997 | Matsumura .............. | A24D 3/10 131/331 |

(Continued)

FOREIGN PATENT DOCUMENTS

| | | |
|---|---|---|
| EP | 0711512 A2 | 5/1996 |
| EP | 0758695 A2 | 2/1997 |

(Continued)

OTHER PUBLICATIONS

International Search Report issued in PCT/JP2012/068985, mailed on Oct. 9, 2012.

(Continued)

*Primary Examiner* — Dennis Cordray
(74) *Attorney, Agent, or Firm* — Birch, Stewart, Kolasch & Birch, LLP

(57) ABSTRACT

To provide a cigarette filter that can achieve both strength in a dry state and disintegration in a wet state, this cigarette filter has a filter plug containing a cellulose ester staple fiber, a pulp, and an alkali metal salt of a water-soluble anionic polymer. The filter plug has an alkali metal content of 2 to 100 µmol per gram of the filter plug. The water-soluble anionic polymer may include at least one member selected from the group consisting of a polyacrylic acid and a polysaccharide having a carboxyl group.

7 Claims, 1 Drawing Sheet

(56) References Cited

U.S. PATENT DOCUMENTS

| | | | |
|---|---|---|---|
| 5,706,833 A | 1/1998 | Tsugaya et al. | |
| 5,711,322 A * | 1/1998 | Tsugaya | A24D 3/16 131/341 |
| 5,720,803 A | 2/1998 | Itoh et al. | |
| 5,913,311 A | 6/1999 | Ito et al. | |
| 5,947,127 A | 9/1999 | Tsugaya et al. | |
| 5,967,149 A | 10/1999 | Tsugaya et al. | |

FOREIGN PATENT DOCUMENTS

| | | | |
|---|---|---|---|
| JP | 7-075542 | A | 3/1995 |
| JP | 8-047385 | A | 2/1996 |
| JP | 8-322539 | A | 12/1996 |
| JP | 9-103281 | A | 4/1997 |
| JP | 11-243939 | A | 9/1999 |
| JP | 3235952 | B2 | 12/2001 |
| JP | 3677309 | B2 | 7/2005 |
| WO | WO 2011/123221 | A1 | 10/2011 |

OTHER PUBLICATIONS

Canadian Office Action, issued Jan. 14, 2015, for Canadian Application No. 2,876,046.

Extended European Search Report dated Jul. 27, 2015, for European Application No. 12878995.5.

* cited by examiner

CIGARETTE FILTER

TECHNICAL FIELD

The present invention relates to a cigarette filter having both a high strength in a dry state and an excellent disintegration in a wet state.

BACKGROUND ART

Cigarette filters require a mechanical strength enough to stand a compressive force exerted by smoker's fingers during smoking. Meanwhile, cigarette filters left in natural environments are desirable to be rapidly disintegrated by water or others. Even if illegally dumped, such cigarette filters are rapidly disintegrable and biodegradable, so that environmental pollution can be reduced. Thus a cigarette filter is required to have both a sufficient strength in a dry state and a sufficient disintegration in a wet state.

For example, Japanese Patent No. 3677309 publication (Patent Document 1, JP-3677309B) discloses a cigarette filter material in the form of a sheet having a paper structure and comprising an uncrimped cellulose ester staple fiber and a beaten pulp, wherein the beaten pulp has a degree of beating of Schopper-Riegler freeness of 20 to 90° SR, the uncrimped cellulose ester staple fiber is a staple fiber having an average fiber length of 1 to 10 mm and a fineness of 1 to 10 deniers. This document discloses that in the preparation of the sheet material there may be employed a binder (for example, a water-soluble adhesive) that does not have a bad influence on human body or decrease the taste and palatability of tobacco smoke or the disintegration of the filter material, and that the amount of the binder is preferably as small as possible (for example, not more than 10% by weight in the total weight of the material). In Examples described in this document, there is an example in that a sheet formed from an uncrimped cellulose acetate staple fiber and a beaten pulp by wet paper production process was sprayed with an aqueous solution of a carboxymethyl cellulose in a proportion of 3% by weight on a dry weight basis to give a sheet material.

Japanese Patent Application Laid-Open Publication No. 7-75542 (Patent Document 2, JP-7-75542A) discloses a cigarette filter comprising a tow of a cellulose ester fiber and a water-soluble polymer that is contained in the tow and bonds the fiber, the tow having been processed into a filter rod using not more than 25 parts by weight of water with respect to 100 parts by weight of the tow. Examples of this document include an example that a cigarette filter tip is obtained by adding 5% by weight of a carboxymethyl cellulose sodium salt as a water-soluble polymer to an opened cellulose acetate crimped fiber tow and feeding the opened tow to a wrapping machine to wrap up the opened tow with a filter wrap.

Japanese Patent Application Laid-Open Publication No. 8-322539 (Patent Document 3, JP-8-322539A) discloses a cigarette filter comprising a nonwoven fabric consisting of a cellulose ester composition and a binder having a good water-dispersibility, the nonwoven fabric being wrapped up into a rod form. Examples of this document include an example that a filter plug is produced by blowing a screen wire with a cellulose acetate staple fiber by air flow for lamination or deposition, and spraying the laminate matter on the wire with 10% by weight of a carboxymethyl cellulose using a 5% aqueous solution of a carboxymethyl cellulose, pressing and drying the wet laminate, subjecting the resulting nonwoven fabric to crepe roll treatment, and then wrapping up the fabric.

The cigarette filters containing these materials are disintegrated by water. Unfortunately, the filters do not have a satisfactory disintegration rate and fail to show an immediate disintegration by water. Meanwhile, these documents disclose addition of a carboxymethyl cellulose metal salt for improving a strength of a cigarette filter. With increasing an amount to be added of the carboxymethyl cellulose metal salt, the strength of the filter increases, while the disintegration thereof decreases. Thus a filter having a sufficient strength cannot be disintegrated in a short period of time, and the filter has an insufficient water disintegration. For the reasons, the strength in a dry state is still difficult to be compatible with the disintegration in a wet state.

RELATED ART DOCUMENTS

Patent Documents

Patent Document 1: JP-3677309B (Claims, paragraph, Examples)
Patent Document 2: JP-7-75542A (Claims, Examples)
Patent Document 3: JP-8-322539A (Claims, Examples)

SUMMARY OF THE INVENTION

Problems to be Solved by the Invention

It is therefore an object of the present invention to provide a cigarette filter being compatible with a sufficient strength in a dry state and a sufficient disintegration in a wet state.

Another object of the present invention is to provide a cigarette filter disintegrable in a very short period of time in a wet state.

Means to Solve the Problems

The inventors of the present invention made intensive studies on the relationship between an amount to be added of a water-soluble polymer and filter characteristics to achieve the above objects and finally found the followings (1) and (2): (1) in a case where a sheet is formed from a cellulose ester staple fiber and a pulp by a paper production method without addition of a water-soluble polymer, the resulting sheet not only has a low strength in a dry state but also has a low disintegration in a wet state due to the formation of cornified or indurated film on the surface by hydrogen bonding between the cellulose ester staple fiber and the pulp; (2) in a case where a specified small amount of an alkali metal salt of a water-soluble anionic polymer is added to the cellulose ester staple fiber and the pulp, in a dry state the resulting sheet has a strength improved due to integration (or unification) of the cellulose ester staple fiber and the pulp through the alkali metal salt of the water-soluble anionic polymer, while in a wet state the sheet is water-disintegrable in a very short period of time probably because the alkali metal salt of the water-soluble anionic polymer prevents the sheet from the cornification due to hydrogen bonding between cellulose fibers of the pulp and hydrogen bonding between the cellulose fiber of the pulp and the cellulose ester staple fiber. The present invention was accomplished based on the above findings.

That is, the present invention includes a cigarette filter that comprises a filter plug (or a rod-like filter material) containing a cellulose ester staple fiber, a pulp, and an alkali metal salt of a water-soluble anionic polymer. The filter plug has an alkali metal content (an amount of an alkali metal derived from the water-soluble anionic polymer) of 2 to 100 μmol (for example, 2 to 90 μmol) per gram of the filter plug.

The water-soluble anionic polymer may contain at least one member selected from the group consisting of a polyacrylic acid and a polysaccharide having a carboxyl group (for example, a carboxymethyl cellulose, an alginic acid). A 1% by weight aqueous solution of the alkali metal salt of the water-soluble anionic polymer may have a viscosity of not more than 100 mPa·s measured at a temperature of 25° C. and a rotational frequency of 60 rpm by B-type viscometer.

The present invention also includes a paper sheet (or a sheet-like filter material) containing a cellulose ester staple fiber, a pulp, and an alkali metal salt of a water-soluble anionic polymer and having an alkali metal content (an amount of an alkali metal derived from the water-soluble anionic polymer) of 2 to 100 µmol per gram of the sheet.

Effects of the Invention

According to the present invention, addition of a specified small amount of an alkali metal salt of a water-soluble anionic polymer to a cellulose ester staple fiber and a pulp allows the resulting sheet to have both a sufficient mechanical strength in a dry state and a sufficient disintegration in a wet state. That is, according to the present invention, the sheet is disintegrable in a very short period of time in a wet state.

DESCRIPTION OF EMBODIMENTS

[Cigarette Filter]

Figure 1:
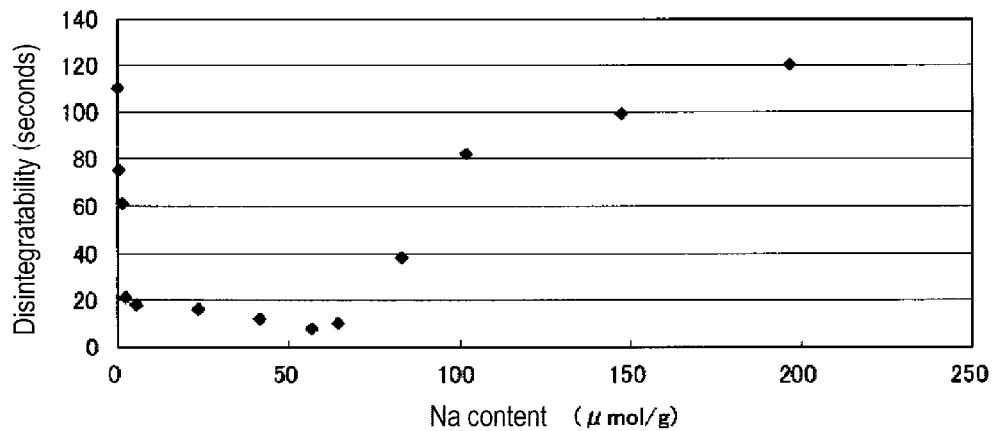
FIG. 1 is a graph showing a relationship between sodium content and disintegratability in sheet-like filter materials produced in Examples.

The cigarette filter of the present invention is provided with a filter plug that is a filter body, and usually, further provided with a filter wrap that covers the filter plug. The filter plug contains a cellulose ester staple fiber, a pulp, and an alkali metal salt of a water-soluble anionic polymer. The cigarette filter usually contains the filter plug, as referred in the present invention, in a filter wrap; the cigarette filter and a body of a cigarette are wrapped in a paper (a tipping paper) to be joined.

The cigarette filter is obtainable by a conventional method, for example, by winding a paper sheet in a rod form using a winding apparatus for paper filter (for example, a filter plug winding machine). Specifically, the cigarette filter can be produced by convoluting a paper sheet, optionally embossed or creped, in a funnel of the winding machine, then wrapping up the convoluted paper sheet in a rod form with a filter wrap, pasting the wrapped product, and cutting the resulting product to a prescribed length. In the wrapping up step, a creped paper sheet is practically wrapped up in a direction crossing or substantially perpendicular to the longitudinal direction (or extending direction) of crinkles. In the pasting step, a water-soluble adhesive is preferably used for pasting of at both ends of the cylindrical filter wrap and pasting of the wrapped-up rod-like paper sheet to the filter wrap, in view of disintegration in a wet state. The cigarette filter containing such a water-soluble adhesive may be referred to in Japanese Patent Application Laid-Open Publication No. 9-47271.

Moreover, the filter wrap or the tipping paper is preferably formed from a water-degradable paper. As described in Japanese Patent Application Laid-Open Publication No. 9-49188, it is preferred to use a filter wrap or tipping paper containing a water-degradable substrate that has at least one side applied to a coating liquid containing a water-soluble polymer and an alkaline compound or is impregnated with the coating liquid.

(Cellulose Ester Staple Fiber)

As a cellulose ester, a cellulose acetate is preferred.

The cellulose ester has an average substitution degree of about 2.4 to 2.6. The average substitution degree can be measured by a conventional method, such as neutralization titration or NMR.

The cellulose ester has a viscosity-average polymerization degree of, for example, about 10 to 1000, preferably about 50 to 900, more preferably about 200 to 800. The viscosity-average polymerization degree may be determined in accordance with the intrinsic viscosity method of Uda et al. (Kazuo Uda and Hideo Saito, Journal of The Society of Fiber Science and Technology, Japan (Sen-i Gakkaishi), Vol. 18, No. 1, pages 105 to 120, 1962). Specifically, a cellulose ester is dissolved in a solvent [e.g., a methylene chloride/methanol (9/1 (weight ratio)) mixed solvent] to prepare a solution having a predetermined concentration c (2 g/L); the solution is injected into an Ostward viscosimeter, and the flow time t of the solution between the viscosimeter graduations at 25° C. is measured. The flow time t0 of the solvent is also measured in the same manner as the above. The viscosity-average polymerization degree can be calculated according to the following equations:

$$\eta_{rel} = t/t_0$$

$$[\eta] = (\ln \eta_{rel})/c$$

$$DP = [\eta]/(6 \times 10^{-4})$$

wherein t shows a flow time of the solution, $t_0$ shows a flow time of the solvent, c represents a concentration of the solution, $\eta_{rel}$ represents a relative viscosity, $[\eta]$ represents an intrinsic viscosity, DP represents a viscosity-average polymerization degree.

The structure and physical properties of the cellulose ester can be analyzed by disintegrating the cigarette filter in water, separating the solid matter (non-water-soluble matter), and extracting the cellulose ester with a predetermined solvent from the separated solid matter.

The cellulose ester is in the form of a staple fiber. If necessary, the cellulose ester may be crimped. In terms of water dispersibility or water disintegration, the cellulose ester is preferably a non-crimped fiber (or an uncrimped fiber). The non-crimped fiber includes not only a fully straight fiber but also a somewhat curved fiber. Since the form of such a curved fiber is easily changed into a straight form in water by a very small shear force due to a stream of water, or other factors, the fiber can possess water dispersibility or water disintegration. The non-crimped fiber may be obtained by spinning (such as dry-spinning, wet-spinning, or melt-spinning) a cellulose ester without crimping or may be obtained by completely removing crimps of a crimped fiber to stretch the fiber [for example, by applying tension to a crimped fiber while heating the crimped fiber with a heating means (e.g., water vapor)].

The cellulose ester staple fiber has an average fiber length (for the crimped fiber, an average distance between both ends of the fiber) of, for example, about 1 to 6 mm, preferably about 1.2 to 5 mm, and more preferably about 1.3 to 4.5 mm (e.g., about 1.5 to 4 mm). In a case where the average fiber length is excessively short, the resulting sheet has a low strength and thus there is a possibility of breaking of the sheet in wrapping up the sheet. In a case where the average fiber length is excessively long, the fiber in tangle causes a low water dispersibility and thus it is difficult to produce a sheet by a wet paper production method; the resulting sheet is also liable to have a low disintegration in a wet state.

The cellulose ester staple fiber has an average fiber diameter of, for example, about 1.5 to 5 deniers, preferably about 2 to 4 deniers, and more preferably about 2.5 to 3.5 deniers.

Examples of the cross-sectional form of the cellulose ester staple fiber may include, but should not be limited to, a Y-shaped form.

The crimpability, average fiber length, average fiber diameter and cross-sectional form of the cellulose ester staple fiber can be determined by disintegrating the cigarette filter in water and observing the resulting disintegration product with a microscope.

(Pulp)

The entanglement and bonding of the pulp to the cellulose ester staple fiber can improve the mechanical strength of the cigarette filter in a dry state and also increase the filtration of harmful components in tobacco smoke.

The pulp preferably includes a natural cellulose pulp, representatively, a linter pulp and a wood pulp (for example, a softwood pulp and a hardwood pulp). Moreover, the pulp preferably includes a chemical pulp (a kraft pulp, a sulfite pulp). In order to increase the cellulose content and the strength, the kraft pulp is preferred. Further, the pulp may be an unbleached pulp, or may be a bleached pulp in terms of hue.

These pulps are usually beaten by a conventional beating machine or lump breaker in practical cases. For example, the beaten pulp has a degree of beating of Schopper-Riegler freeness of about 10 to 90° SR, preferably about 15 to 70° SR, and more preferably about 20 to 50° SR. A pulp having an excessively low degree of beating has a low adhesion to the cellulose ester staple fiber, and the resulting filter tends to have a low sheet strength. A pulp having an excessively high degree of beating makes the fiber bonding force or adhesion too strong, and the resulting filter tends to have a low disintegration in a wet state.

The ratio of the cellulose ester staple fiber relative to the pulp in the filter plug is, for example, about 30/70 to 95/5 (e.g., about 35/65 to 92/8), preferably about 40/60 to 90/10 (e.g., about 50/50 to 88/12), and more preferably about 60/40 to 85/15 (e.g., about 70/30 to 80/20) in a weight ratio of the former/the latter. In a case where the ratio of the cellulose ester staple fiber is too low, the resulting filter tends to have a low disintegration in a wet state, and additionally tends to make the taste and palatability (or flavor) of tobacco smoke worse and have a low selective removal of a phenol compound or others. In contrast, in a case where the ratio of the pulp is too low, the resulting filter tends to have a low sheet strength.

In order to analyze the ratio of the cellulose ester staple fiber and the pulp, the following procedure is used: the filter plug, which is obtained by removing the filter wrap from the cigarette filter, is disintegrated in water and then washed with an excess of water to remove the water-soluble anionic polymer, and the solid matter is separated by filtration; the resulting solid matter is washed with an excess of acetone to dissolve and remove the cellulose ester; the residue is weighed and compared with the weight of the filter plug to determine the ratio of the cellulose ester staple fiber and the pulp. Incidentally, the water-soluble anionic polymer content may be separately determined by condensing and drying the wash water and weighing the solid matter.

(Alkali Metal Salt of Water-Soluble Anionic Polymer)

According to the present invention, the addition of a specifically small amount of the water-soluble polymer allows the cigarette filter to possess both a high strength in a dry state and a sufficient disintegration in a wet state. The water-soluble polymer may include an anionic water-soluble polymer and a cationic water-soluble polymer. As the water-soluble polymer to be used in the present invention, there may be used an anionic water-soluble polymer, in particular, an alkali metal salt of a water-soluble anionic polymer. A specifically small amount of the alkali metal salt of the water-soluble anionic polymer, in a dry state, can improve the strength of the cigarette filter due to integration (or unification) of the cellulose staple fiber and the pulp, and can inhibit the cornification due to hydrogen bonding between fibers. The cornification is a phenomenon that the component existing at or near the surface is condensed to harden in the film form. Probably due to these reasons, the disintegration of the cigarette filter can markedly be improved.

The water-soluble anionic polymer may include a polysaccharide [for example, a polysaccharide having a carboxyl group, e.g., a carboxymethyl cellulose, a carboxymethyl-$C_{2-3}$alkyl cellulose (such as a carboxymethylethyl cellulose), a carboxymethyl starch, and an alginic acid; and a polysaccharide having a sulfo group, e.g., a pectin, a carrageenan, a hyaluronic acid, and a chondroitin sulfate), a polyacrylic acid, and others.

The acidic group (such as carboxyl group or sulfo group) of the water-soluble anionic polymer forms a salt with an alkali metal. The alkali metal may include lithium, sodium, potassium, and others. These alkali metals may be used alone or in combination. Among these alkali metals, sodium is preferred.

The alkali metal salt of the water-soluble anionic polymer has a degree of neutralization of not less than 0.6, preferably not less than 0.9, and more preferably 1.0. In a case where the degree of neutralization is too low, in a dry state unsubstituted hydroxyl and carboxyl groups in the water-soluble anionic polymer are allowed to react with each other (dehydration reaction by heating) to be cross-linked; the resulting cigarette filter has a low disintegration.

For example, the degree of neutralization can be measured and calculated by the following method. The cigarette filter is washed with an excess of water, and the solid matter is removed therefrom. The resulting wash water is condensed to give an extract solution S of a water-soluble anionic polymer. A portion of the solution is subjected to neutralization titration with an aqueous solution of sodium hydroxide, and an alkali (sodium hydroxide) consumption $A_1$ (mol) is calculated. Meanwhile, an excess of hydrochloric acid B (mol) is added to another portion, which is the same amount as the above portion, of the extract solution S to convert all salt-forming groups into acid-type groups. The resulting solution is then subjected to neutralization titration with an aqueous solution of sodium hydroxide, and an alkali consumption $A_2$ (mol) is calculated. Substituting $A_1$, $A_2$, and B into the following equation can give a degree $\alpha$ of neutralization of the water-soluble anionic polymer.

$$\alpha=(B-A_2)/(A_1+B-A_2)$$

Alternatively, a portion of the extract solution S and an acid-type solution that is obtained by adding an excess of hydrochloric acid to another portion, which is the same amount as the above portion, of the extract solution S are separately dried to give water-soluble anionic polymer powders. The peak strength ($I_A$) of carbonyl groups in the form of an alkali metal salt and the peak strength ($I_B$) in the free carbonyl group form are measured by an infrared absorption spectrum. Substituting $I_A$ and $I_B$ into the following equation may give a degree $\alpha$ of neutralization.

$$\alpha=1-I_A/I_B$$

These alkali metal salts of the water-soluble anionic polymers may be used alone or in combination. In the light of the disintegration in a wet state, among these alkali metal salts of the water-soluble anionic polymers, a preferred alkali metal salt includes an alkali metal salt of a polyacrylic acid, an alkali metal salt of a polysaccharide having a carboxyl group (for example, a carboxymethyl cellulose, a carboxymethyl-$C_{2-3}$alkyl cellulose, a carboxymethyl starch, and an alginic acid)]. In particular, an alkali metal salt of a polysaccharide having a carboxyl group (e.g., carboxymethyl group) (for example, a carboxymethyl cellulose, a carboxymethyl-$C_{2-3}$alkyl cellulose, and a carboxymethyl starch) is preferred.

In the alkali metal salt of the polysaccharide having a carboxyl group (for example, a carboxymethyl cellulose), the average substitution degree of a carboxyl group (e.g., carboxymethyl group) forming an alkali metal salt (the average substitution degree with respect to hydroxyl groups on 2-, 3- and 6-positions of a glucose unit constituting a polysaccharide; average etherification degree; e.g., DS) is about 0.4 to 2.5 (e.g., about 0.5 to 2.4), preferably about 0.55 to 2 (e.g., about 0.6 to 1.8), and more preferably about 0.65 to 1.5 (e.g., about 0.7 to 1.2). Ina case where the average substitution degree is too small, the resulting cigarette filter tends to have a low disintegration in a wet state. In a case where the average substitution degree is too large, the resulting cigarette filter tends to have a low strength in a dry state.

A 1% by weight aqueous solution of the alkali metal salt of the water-soluble anionic polymer may have a viscosity of, for example, not more than 100 mPa·s (preferably not more than 50 mPa·s), usually not more than 30 mPa·s (e.g., not more than 25 mPa·s), preferably not more than 20 mPa·s (e.g., not more than 15 mPa·s), and more preferably detection limit to 15 mPa·s (e.g., 1 to 15 mPa·s) as measured by B-type viscometer at a rotational frequency of 60 rpm at a temperature of 25° C.

A 2% by weight aqueous solution of the alkali metal salt of the water-soluble anionic polymer may have a viscosity of not less than 2 mPa·s (e.g., not less than 5 mPa·s), preferably not less than 8 mPa·s, and more preferably not less than 10 mPa·s (e.g., 10 to 150 mPa·s) as measured by B-type viscometer at a rotational frequency of 60 rpm at a temperature of 25° C. In a case where the aqueous solution of the alkali metal salt of the water-soluble anionic polymer has an excessively high viscosity, in an early period when the cigarette filter received an action of water, the aqueous solution of the water-soluble anionic polymer formed at or near fibers becomes viscous and hinders the diffusion of the fibers. Thus the cigarette filter has a low disintegration in a wet state.

Figure 2:
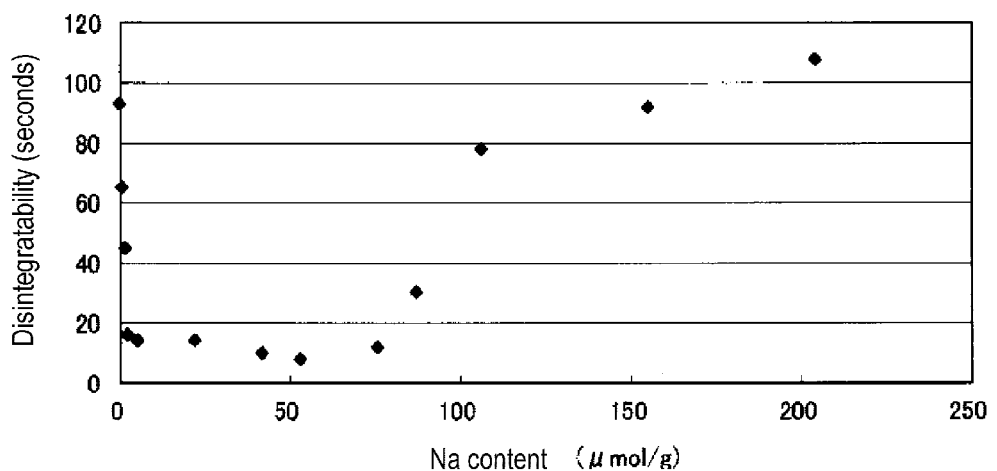
FIG. 2 is a graph showing a relationship between sodium content and disintegratability in rod-like filter materials produced in Examples.

The amount to be added of the alkali metal salt of the water-soluble anionic polymer exerts a great influence on the disintegration. Specifically, the following is proved after detailed investigation on the relationship between the amount to be added of the alkali metal salt of the water-soluble anionic polymer and the disintegration: as shown in FIG. 1 or FIG. 2, the alkali metal content greatly influences the disintegration; an markedly low alkali metal content significantly increases the disintegration (extremely shortens the time required to disintegration) probably due to a low bonding force between the water-soluble anionic polymers or probably due to a prevented increase in viscosity of a solution formed at or near the fibers in an early period when the cigarette filter received an action of water.

More specifically, a cigarette filter having an alkali metal content beyond 100 μmol/g has a significant low disintegration. In contrast, a cigarette filter having an alkali metal content of not more than 100 μmol/g (e.g., not more than 90 μmol/g, preferably not more than 87 μmol/g) has a significantly improved disintegration for the above-mentioned reasons and has characteristics enough for practical purpose. The boundary value of the alkali metal content is 100 μmol/g. Since the disintegration somewhat fluctuates at or near the boundary value, it is very preferred that the alkali metal content be more than 80 μmol/g (e.g., not more than 76 μmol/g) as a stable region.

Moreover, a cigarette filter having an excessively low alkali metal content is not disintegrated. As a concrete numeric value, the boundary value is 2 μmol/g; a cigarette filter having an alkali metal content lower than this boundary value fails to possess a sufficient disintegration probably because the filter is cornified (indurated) to form an aggregate due to insufficient inhibition of hydrogen bonding between fibers.

From such a behavior, the alkali metal content is about 2 to 100 μmol, preferably about 2 to 90 μmol, more preferably about 2 to 87 μmol, and particularly about 3 to 75 μmol, per gram of the filter plug. The alkali metal content can be measured by ashing and burning the filter plug and then subjecting the resulting matter to atomic absorption analysis and inductively coupled plasma emission spectrometry.

The water-soluble anionic polymer alkali metal salt content (molar quantity of anionic group) may be substantially the same as the alkali metal content (molar quantity). That is, per gram of the filter plug, the water-soluble anionic polymer alkali metal salt content (molar quantity of anionic group) can be selected from the same range as mentioned above (for example, about 2 to 100 μmol). The presence of the water-soluble anionic polymer alkali metal salt can be confirmed by washing the cigarette filter with an excess of water, condensing the wash water purified of the solid matter, drying the condensate to give a solidified product containing the water-soluble anionic polymer alkali metal salt, dissolving the solidified product in a suitable solvent, and analyzing the resulting solution with C13-NMR or other means.

If necessary, the cigarette filter may contain various additives, for example, a sizing agent, a stabilizer, a coloring agent, an oil, a yield-increasing agent, a defoaming agent, and an activated carbon. These additives may be used alone or in combination.

[Paper Sheet]

The paper sheet (sheet-like filter material) of the present invention, that is, the material for the filter plug, contains a cellulose ester staple fiber, a pulp, and an alkali metal salt of a water-soluble anionic polymer. Each content of the paper sheet is substantially the same as each content of the cigarette filter plug (rod-like filter material).

The paper sheet has a basis weight of, for example, about 10 to 60 g/m$^2$, preferably about 15 to 45 g/m$^2$, and more preferably about 20 to 40 g/m$^2$. A sheet having a small basis weight is difficult to produce by a paper production method. For a sheet having a large basis weight, it is different to form crepes on the sheet in a creping process, and ununiform spaces are easily formed at the cross section of the filter.

The paper sheet has a tensile strength (kgf/15 mm) of, for example, about 0.35 to 5, preferably about 0.38 to 4.5, and more preferably about 0.4 to 4 (e.g., about 0.42 to 3.5) in accordance with JIS (Japanese Industrial Standards) P-8113.

The paper sheet can be prepared by a conventional method, for example, by subjecting a composition (slurry) containing a cellulose ester staple fiber, a pulp, which is beaten optionally, and water to a wet paper production method. Specifically, the paper sheet can be prepared by spreading the composition on a wire gauze to prepare a wet paper, and dehydrating and optionally pressing the wet paper for drying. The wet paper may be prepared by a handmade paper production in accordance with JIS P8222 or may be prepared mechanically by a conventional paper making machine (such as a fourdrinier machine or a cylinder machine).

The paper sheet containing the alkali metal salt of the water-soluble anionic polymer may be prepared by adding the alkali metal salt of the water-soluble anionic polymer to the composition and then subjecting the resulting mixture to the wet paper production method, or may be prepared by spraying or applying an aqueous solution of the alkali metal salt of the water-soluble anionic polymer on a wet or dry paper sheet or by immersing a wet or dry paper sheet in an aqueous solution of the alkali metal salt of the water-soluble anionic polymer.

The amount of the alkali metal salt of the water-soluble anionic polymer to be added (or attached) to the composition (or the paper sheet) can be selected within a range of an infinitesimal quantity and may be about 50 to 2700 ppm (on the basis of weight) and preferably about 50 to 2400 ppm (on the basis of weight).

The paper sheet is preferably embossed (or creped) in order to smoothly and uniformly pass tobacco smoke through the paper sheet in the form of a filter. The embossing may be performed by pressing the paper sheet on a roller having a surface with raised portions arranged in a pattern (such as a grid (or lattice) pattern or a random pattern) or may be performed by running the paper sheet between a pair of rollers as mentioned above. The running speed of the paper sheet may be, but should not be limited to, for example, about 50 to 150 m/min. and preferably about 80 to 120 m/min. Moreover, the surface temperature of the roller may be, but should not be limited to, for example, about 50 to 200° C. and preferably about 100 to 150° C.

The roller has a pitch of raised portions (an average value of a center distance between adjacent raised portions) of, for example, about 0.5 to 5 mm and preferably about 1 to 4 mm. Moreover, the depth of recessed portions (or the height of raised portions) in the roller is, for example, about 0.1 to 1 mm and preferably about 0.2 to 0.8 mm.

Figure 3:
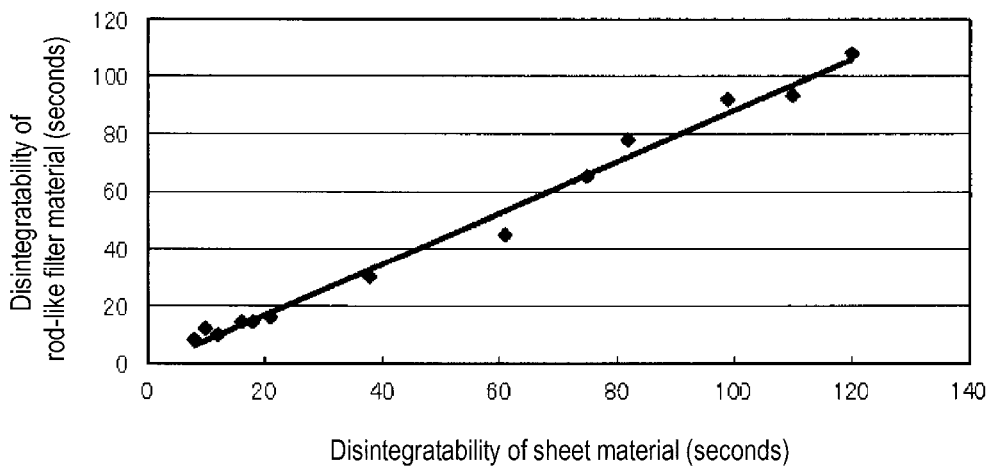
FIG. 3 is a graph showing a relationship between the disintegratability of sheet-like filter materials produced in Examples and the disintegratability of rod-like filter materials produced in Examples.

The detailed investigation on the relation between the disintegration of the paper sheet (sheet-like filter material) and the disintegration of the filter plug (rod-like filter material) showed that there is a linear relation (positive correlation) therebetween as shown in FIG. 3. This reveals that the addition of a small amount of the alkali metal salt of the water-soluble anionic polymer to the paper sheet allows the filter plug, which is formed by wrapping up the paper sheet in a rod form, to be disintegrated in a very short period of time.

EXAMPLES

Hereinafter, the following examples are intended to describe this invention in further detail and should by no means be interpreted as defining the scope of the invention. Each evaluation item in examples was evaluated as follows.

[Concentration of Sodium]

A sample (0.1 g) was weighed out accurately, put in a platinum crucible, ashed with a hot plate and a Bunsen burner, and then dry-decomposed (burned) in an electric furnace at 400° C. for 1 hour followed by at 500° C. for 1.5 hours. Then, nitric acid for atomic absorption analysis (manufactured by Kanto Chemical Co., Inc.) was diluted 10-fold with ultra-pure water, and the 10-fold diluted solution was added to the product. The resultant was covered with a watch glass and dissolved by heating on a sand bath (set to 250° C.) to give a solution. The resulting solution was diluted with ultra-pure water in a measuring cylinder to 10 ml total, and the diluted solution was subjected to a usual method using an inductively coupled plasma emission spectrophotometer (ICP-AES) (manufactured by Rigaku Corporation, CIROS 120) to measure ($C_1$) a concentration of sodium. Meanwhile, according to the procedures as stated above without putting a sample in a platinum crucible, ($C_2$) a concentration of sodium was measured. From the difference ($C_1$-$C_2$) in concentration of sodium, the concentration of sodium in the sample was calculated.

A standard solution for working curve used was prepared by diluting a standard solution for atomic absorption manufactured by Kanto Chemical Co., Inc. (concentration of sodium: 1000 ppm) with a 0.1 N aqueous solution of nitric acid to give four diluted solutions (concentration of sodium: 0 ppm, 0.1 ppm, 1 ppm, 10 ppm).

[Concentration of Carboxymethyl Cellulose Sodium Salt]

($C_3$) A concentration of sodium in a sample and ($C_4$) a concentration of sodium in carboxymethyl cellulose sodium salt (CMC) were substituted into the following equation to calculate ($C_5$) a concentration of CMC in the sample.

$$C_5 = (C_3/C_4) \times 100$$

[Disintegratability]

Each of paper sheets (sheet-like filter materials) in Examples and each of filter plugs (rod-like filter materials) in Examples were evaluated for the disintegratability (or ease of disentanglement) in accordance with JIS P4501. Incidentally, each filterplug was obtained by cutting a cigarette filter to a length of 25 mm and detaching a filter wrap from the cut cigarette filter.

[Tensile Strength]

A tensile strength of a sample having a width of 15 mm was measured in accordance with JIS P-8113. Incidentally, in each of examples of plug production, a paper sheet before creping (an uncreped paper sheet) was used as a sample.

[Taste and Palatability Test]

A filter plug sample was attached to a cigarette [which was produced by removing a filter plug from a commercially available cigarette (trade name "Peace Light Box" manufactured by Japan Tobacco, Inc.)] to give a sample cigarette. Five smokers smoked and compared the sample cigarette and the original cigarette and evaluated the change of aroma and palatability on the basis of the following criteria. The results are the average of the five smokers.
5: There is hardly any change.
4: Slight change is felt.
3: Apparent change is felt.
2: There is a significant change.
1: The sample cigarette is different from the original cigarette in taste and palatability.

Comparative Examples 1 to 6, Examples 1 to 7

Seventy (70) parts by weight of an uncrimped cellulose acetate staple fiber (having a Y-shaped cross section, a fineness of 3.3 deniers, a fiber length of 3.5 mm, a substitution degree of 2.45), 30 parts by weight of a bleached soft wood kraft pulp having a degree of beating of 44° SR, and a predetermined amount of a carboxymethyl cellulose sodium salt (CMC1220 manufactured by Daicel Corporation, etherification degree=0.86, viscosity of 1% by weight aqueous solution=13 mPa·s, concentration of sodium=8.7% by weight) were mixed to prepare a pulp suspension. The suspension was subjected to a wet paper production method in accordance with JIS P8222, and the resulting wet paper was dehydrated and dried to give paper sheets of different CMC concentrations. Table 1 shows the evaluation characteristics of the paper sheets. FIG. 1 shows a relationship between sodium content and disintegratability (or ease of disentanglement). Incidentally, for Comparative Example 6, a paper sheet was prepared without addition of CMC.

[Table 1]

TABLE 1

| | Content of sheet | | Basis | Tensile | JIS P4501 |
|---|---|---|---|---|---|
| | Sodium | CMC 1220 | weight of sheet | strength of sheet | Dis-integratability |
| | ppm | μmol/g | % | g/m² | kgf/15 mm | sec. |
| Com. Ex. 1 | 4524 | 197 | 5.2 | 32 | 0.74 | 120 |
| Com. Ex. 2 | 3393 | 148 | 3.9 | 30 | 0.63 | 99 |
| Com. Ex. 3 | 2349 | 102 | 2.7 | 31 | 0.59 | 82 |
| Ex. 1 | 1914 | 83 | 2.2 | 31 | 0.56 | 38 |
| Ex. 2 | 1479 | 64 | 1.7 | 32 | 0.55 | 10 |
| Ex. 3 | 1305 | 57 | 1.5 | 30 | 0.51 | 8 |

TABLE 1-continued

| | Content of sheet | | | Basis weight of sheet | Tensile strength of sheet | JIS P4501 Dis-integratability |
|---|---|---|---|---|---|---|
| | Sodium | | CMC 1220 | | | |
| | ppm | µmol/g | % | g/m² | kgf/15 mm | sec. |
| Ex. 4 | 957 | 42 | 1.1 | 28 | 0.46 | 12 |
| Ex. 5 | 539 | 23 | 0.62 | 29 | 0.45 | 16 |
| Ex. 6 | 131 | 5.7 | 0.15 | 30 | 0.44 | 18 |
| Ex. 7 | 54 | 2.3 | 0.062 | 32 | 0.46 | 21 |
| Com. Ex. 4 | 33 | 1.4 | 0.038 | 31 | 0.45 | 61 |
| Com. Ex. 5 | 10 | 0.4 | 0.011 | 29 | 0.42 | 75 |
| Com. Ex. 6 | 0 | 0 | 0 | 30 | 0.43 | 110 |

As apparent from Table 1, in comparison with Comparative Examples, the sheets of Examples have higher tensile strength and extremely shorten the disintegration time.

Comparative Examples 7 to 12, Examples 8 to 14

Each pulp suspension was prepared in the same manner as in Comparative Examples 1 to 6 and Examples 1 to 7 and subjected to a wet paper production method by a cylinder machine, and the resulting wet paper was dehydrated and dried to give a mechanically produced paper sheet having a basis weight shown in Table 2 and a width of 270 mm. The resulting mechanically produced paper sheet was creped at a speed of 100 m/min. using a crepe roller (surface temperature: 140° C., groove pitch: 2.0 mm, groove depth: 0.6 mm). The creped sheet was wrapped up at a speed of 150 m/min. to produce a cigarette filter having a length of 100 mm and a circumference of 24.5 mm. The resulting cigarette filter was cut to a length of 25 mm, and a filter wrap was detached from the filter to separate a filter plug alone. Table 2 shows the evaluation characteristics of the filter plugs. FIG. 2 shows a relationship between sodium content and disintegratability (or ease of disentanglement). Further, FIG. 3 shows a relationship between the disintegratability of the filter plugs and the disintegratability of the paper sheets.

[Table 2]

As apparent from Table 2, in comparison with Comparative Examples, the sheets of Examples have higher tensile strength and extremely shorten the disintegration time. Further, for the Examples, the change of the aroma and palatability is small.

Comparative Example 13

Corresponding to Example 18 of Patent Document 1

Sixty (60) parts by weight of an uncrimped cellulose acetate staple fiber (having a Y-shaped cross section, a fineness of 3 deniers, a fiber length of 4 mm, a substitution degree of 2.45) and 40 parts by weight of a bleached soft wood kraft pulp having a degree of beating 40° SR were subjected to a wet paper production method using a cylinder machine, and the resulting wet paper was dehydrated and dried to give a mechanically produced paper sheet. The mechanically produced paper sheet was sprayed with an aqueous solution containing 5% by weight of a carboxymethyl cellulose in a proportion of 3% by weight relative to the mechanically produced paper sheet on a dry weight basis. The resulting sprayed paper was dried to give a sheet material having a basis weight of 30 g/m² and a width of 270 mat. The sheet material had a longitudinal tensile strength of 1.48 kgf/15 mm.

The resulting sheet material was creped at a speed of 100 m/min. using a crepe roller (surface temperature: 140° C., groove pitch: 2.0 mm, groove depth: 0.6 mm). The creped

TABLE 2

| | Content of sheet | | | Basis weight of sheet | Longitudinal tensile strength of sheet | JIS P4501 Disintegratability | Aroma and palatability |
|---|---|---|---|---|---|---|---|
| | Sodium | | CMC 1220 | | | | |
| | ppm | µmol/g | % | g/m² | kgf/15 mm | sec. | |
| Com. Ex. 7 | 4698 | 204 | 5.4 | 31 | 1.01 | 108 | 2.4 |
| Com. Ex. 8 | 3567 | 155 | 4.1 | 30 | 0.92 | 92 | — |
| Com. Ex. 9 | 2436 | 106 | 2.8 | 32 | 0.91 | 78 | — |
| Ex. 8 | 2001 | 87 | 2.3 | 29 | 0.80 | 30 | 2.8 |
| Ex. 9 | 1740 | 76 | 2 | 30 | 0.81 | 12 | — |
| Ex. 10 | 1218 | 53 | 1.4 | 30 | 0.78 | 8 | — |
| Ex. 11 | 957 | 42 | 1.1 | 31 | 0.79 | 10 | 3.6 |
| Ex. 12 | 505 | 22 | 0.58 | 32 | 0.79 | 14 | 3.6 |
| Ex. 13 | 113 | 4.9 | 0.13 | 29 | 0.69 | 14 | — |
| Ex. 14 | 51 | 2.2 | 0.059 | 31 | 0.74 | 16 | 4.0 |
| Com. Ex. 10 | 30 | 1.3 | 0.035 | 30 | 0.71 | 45 | — |
| Com. Ex. 11 | 10 | 0.5 | 0.012 | 32 | 0.76 | 65 | — |
| Com. Ex. 12 | 0 | 0 | 0 | 30 | 0.71 | 93 | — | sheet material was wrapped up at a speed of 150 m/min. to produce a cigarette filter having a length of 100 mm and a circumference of 24.5 mm. The resulting cigarette filter was cut to a length of 25 mm, and a filter wrap was detached from the filter to separate a filter plug alone. The disintegratability of the filter plug measured 91 seconds in accordance with JIS P4501.

Examples 15 to 17

Each filter plug was produced in the same manner as in Example 13 except that the fiber length of the uncrimped cellulose acetate staple fiber was changed as shown in Table 3. The evaluation characteristics of the filter plugs are shown in Table 3.

[Table 3]

TABLE 3

| | Fiber length of cellulose acetate staple fiber | Content of sheet | | Basis weight of sheet | Longitudinal tensile strength of sheet | JIS P4501 Disintegratability | Aroma and palatability |
| | | Sodium | CMC 1220 | | | | |
| | mm | ppm | μmol/g | % | g/m² | kgf/15 mm | sec. |
|---|---|---|---|---|---|---|---|---|
| Ex. 15 | 2 | 113 | 5 | 0.13 | 31 | 0.38 | 11 | — |
| Ex. 16 | 3 | 122 | 5 | 0.14 | 30 | 0.59 | 13 | — |
| Ex. 17 | 4 | 113 | 5 | 0.13 | 32 | 0.80 | 18 | — |

As apparent from Table 3, the disintegration of the sheet tends to be somewhat improved as the fiber length of the cellulose acetate staple fiber is shortened.

Examples 18 to 20

Each filter plug was produced in the same manner as in Example 13 except that the mixing ratio of the uncrimped cellulose acetate staple fiber and the bleached soft wood kraft pulp was changed as shown in Table 4. The evaluation characteristics of the filter plugs are shown in Table 4.

[Table 4]

TABLE 4

| | Mixing ratio | | Content of sheet | | Basis weight of sheet | Longitudinal tensile strength of sheet | JIS P4501 Disintegratability | Aroma and palatability |
| | Cellulose acetate staple fiber parts by weight | Bleached soft wood kraft pulp parts by weight | Sodium | CMC 1220 | | | | |
| | weight | weight | ppm | μmol/g | % | g/m² | kgf/15 mm | sec. | |
|---|---|---|---|---|---|---|---|---|---|
| Ex. 18 | 80 | 20 | 131 | 6 | 0.15 | 32 | 0.35 | 11 | 4.0 |
| Ex. 19 | 60 | 40 | 122 | 5 | 0.14 | 31 | 1.31 | 22 | 3.0 |
| Ex. 20 | 40 | 60 | 113 | 5 | 0.13 | 30 | 2.49 | 35 | 2.8 |

As apparent from Table 4, the disintegration of the sheet tends to be somewhat improved as the mixing ratio of the cellulose acetate staple fiber increases.

Examples 21 to 23

Each filter plug was produced in the same manner as in Example 13 except that CMC 1110 (manufactured by Daicel Corporation, etherification degree=0.73, viscosity of 2% by weight aqueous solution=111 mPa·s), sodium alginate (KIMIKA ALGIN BL-2, manufactured by KIMIKA Corporation, viscosity of 1% by weight aqueous solution=36 mPa·s), or sodium polyacrylate (JURYMER AC-103, manufactured by Toagosei Co., Ltd., viscosity of aqueous solution having a solid content of 40% by weight=350 mPa·s) was used instead of the carboxymethyl cellulose sodium salt CMC 1220. The evaluation characteristics of the filter plugs are shown in Table 5.

[Table 5]

TABLE 5

| | Alkali metal salt of anionic polymer | Content of sheet | | Alkali metal salt of anionic polymer % | Basis weight of sheet g/m² | Longitudinal tensile strength of sheet kgf/15 mm | JIS P4501 Disintegratability sec. | Aroma and palatability |
|---|---|---|---|---|---|---|---|---|
| | | Sodium | | | | | | |
| | | ppm | μmol/g | | | | | |
| Ex. 21 | CMC 1110 | 113 | 5 | 0.15 | 32 | 0.55 | 15 | — |
| Ex. 22 | KIMIKA ALGIN BL-2 | 160 | 7 | 0.15 | 31 | 1.12 | 18 | — |
| Ex. 23 | JURYMER AC-103 | 343 | 15 | 0.14 | 32 | 0.65 | 22 | — |

As apparent from Table 5, though different in the species of the alkali metal salt of the anionic polymer, the sheets have high tensile strength and extremely shorten the disintegration time.

INDUSTRIAL APPLICABILITY

The cigarette filter of the present invention is attached to a cigarette body containing dried tobacco leaf for use. The site to be disposed of the cigarette filter practically includes, but should not be limited to, a mouthpieth of a cigarette body, a site between a mouthpieth and a cigarette body. Such a cigarette filter has an excellent strength in a dry state and is easy to smoke. Even if illegally dumped, the cigarette filter is disintegrated by rainwater or others, so that environmental pollution can be reduced.

The invention claimed is:

1. A cigarette filter comprising a filter plug containing a cellulose ester staple fiber, a pulp, and an alkali metal salt of a water-soluble anionic polymer,
   wherein the filter plug has an alkali metal content of 2 to 100 μmol per gram of the filter plug.

2. A cigarette filter according to claim 1, wherein the water-soluble anionic polymer comprises at least one member selected from the group consisting of a polyacrylic acid and a polysaccharide having a carboxyl group.

3. A cigarette filter according to claim 1, wherein the water-soluble anionic polymer comprises a carboxymethyl cellulose or an alginic acid.

4. A cigarette filter according to claim 1, wherein the alkali metal content is 2 to 90 μmol per gram of the filter plug.

5. A paper sheet comprising a cellulose ester staple fiber, a pulp, and an alkali metal salt of a water-soluble anionic polymer,
   wherein the paper sheet has an alkali metal content of 2 to 100 μmol per gram of the paper sheet.

6. A cigarette filter according to claim 1, wherein the cellulose ester staple fiber has an average fiber length of 1 to 6 mm.

7. A cigarette filter according to claim 1, wherein the filter plug has an alkali metal content of 3 to 75 μmol per gram of the filter plug.

* * * * *